United States Patent [19]

Krick

[11] 4,103,317
[45] Jul. 25, 1978

[54] MOTOR PROTECTOR PROVIDING PHASE FAILURE AND OVERLOAD CUTOFF FOR THREE-PHASE VARIABLE VOLTAGE VARIABLE FREQUENCY MOTOR

[75] Inventor: John B. Krick, Newark, Del.

[73] Assignee: Val Tech Inc., Newark, Del.

[21] Appl. No.: 693,421

[22] Filed: Jun. 7, 1976

[51] Int. Cl.² .............................................. H02H 3/08
[52] U.S. Cl. ...................................... 361/31; 318/474
[58] Field of Search .................... 361/31, 76; 318/474, 318/478, 479

[56] References Cited

U.S. PATENT DOCUMENTS

| 3,465,206 | 9/1969 | Harker et al. | 361/31 |
| 3,609,461 | 9/1971 | Obenhaus et al. | 361/31 |
| 3,912,976 | 10/1975 | Sons et al. | 361/31 |
| 3,932,789 | 1/1976 | Sons et al. | 361/31 |

Primary Examiner—Herman Hohauser
Attorney, Agent, or Firm—Connolly and Hutz

[57] ABSTRACT

A circuit for a polyphase motor which operates in response to undesirable operating conditions so as to prevent damage to the electric motor. The protection circuit converts current to voltage over a range of operating currents. The current sensitive voltage in response to an undesired current condition triggers the operation of a gating circuit to apply potential to an output switch which in turn controls the current supply and stops the motor. The gating circuit is also triggered by a detector circuit sensing a deficiency in motor current to thereby actuate the output switch and interrupt the motor operation and thus protect the motor. A timing circuit provides an inverse time function in conjunction with the voltage applied to the gating circuit. The timing circuit is adjustable to provide adjustability in the elapsed time for providing a triggering voltage to the gating circuit.

6 Claims, 7 Drawing Figures

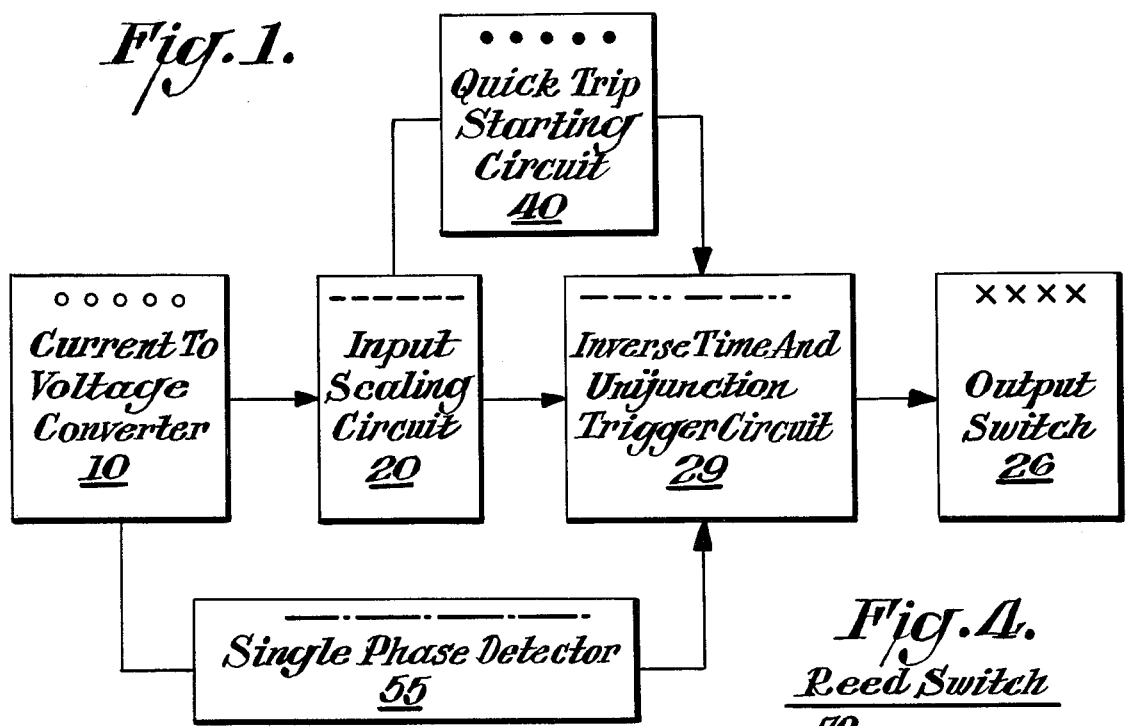
Fig. 1.
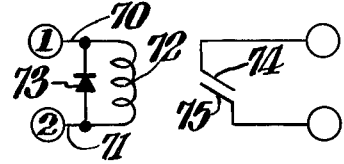
Fig. 4. Reed Switch
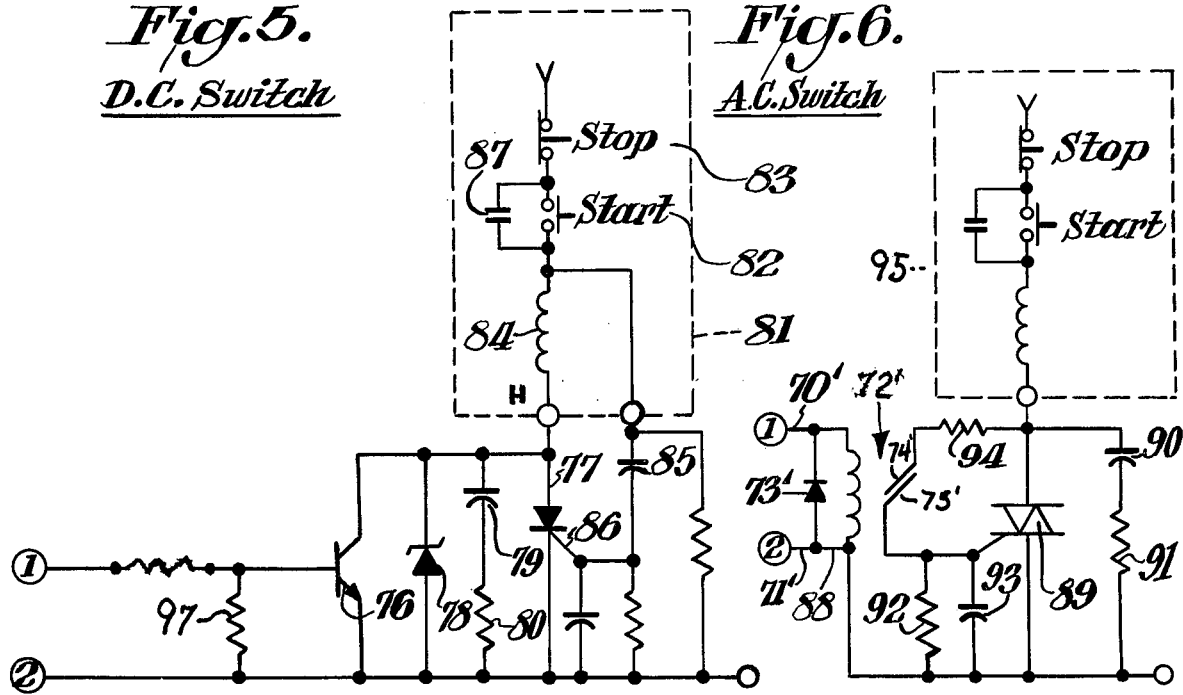
Fig. 5. D.C. Switch
Fig. 6. A.C. Switch

MOTOR PROTECTOR PROVIDING PHASE FAILURE AND OVERLOAD CUTOFF FOR THREE-PHASE VARIABLE VOLTAGE VARIABLE FREQUENCY MOTOR

This invention relates to protective circuitry for a three-phase electric motor and more particularly to circuitry which opens the circuit providing current to the motor windings upon detection of either an overload in the motor current or a failure in one of the motor phases, said failure being detected either during operation or on start-up.

BACKGROUND OF THE INVENTION

Phase failure responsive protection circuits for three-phase motors have been provided in which the absence of operativeness of all of the phases has been detected and upon such detection a means operated to disconnect the motor circuit. Means have also been provided in conjunction with this phase failure detection for detecting a current overload to supply a signal which also acts to operate the means for breaking the motor circuit. Thus this basic circuit has provided both overload protection and phase failure protection by the operation of the same means for breaking the motor circuit. Also circuitry has been provided for sensing overload conditions in an electric motor by means of current sensing loops in transformers which develop DC voltages. These DC voltages in turn are supplied to means for triggering a relay which upon operation will open a switch controlling the motor. In this device there is provided a limited adjustment making it possible for different magnitudes of current flowing in the motor windings to cause an overload tripping of the device and an interruption in the supply of the current to thus stop operation of the motor.

These prior circuits for motor controls are less than completely satisfactory. Their characteristics vary with frequency requiring calibration of the particular protection system to a specific disclosed frequency. The time for developing the trigger signal is not adjustable.

The adaptation of the protection system to a variety of frequencies, however, is important, particularly in certain motor uses. In drawing synthetic filaments, for example, the requirements placed on an individual power source can widely vary when providing the drive to conventional operations of the filament drawing machine. Moreover, this variation in requirements may be demanded of the individual power source within a short time span so that if a protection system is limited, as for example to a specific frequency, the incessant recalibration is onerous. What is desired is a three-phase motor overload protection device which cuts off the motor if the motor current exceeds the preset level for a time, the period of which is adjustable, for a range of motor currents over a base rating, the time of cutoff being related to the percent of overload.

There are other desired features in a motor protection circuit which are not provided by presently known systems. For example, it is advantageous to provide a means for detecting the condition where one of the phases in the three-phase motor is open and would be able to trip or trigger the means for disconnecting the motor current immediately if the motor current is operating at full load but at a somewhat longer period than the fastest trip time if the motor is operating partially loaded at a current value which is below the full load rating. Under a condition at motor start-up where one of the windings is open and non-conductive it is desirable to limit the voltage output from the current transformer during the period of conduction under this faulty condition by utilizing some means for limiting this voltage output from the current transformer.

It is also desirable to provide protection against operation when less than all of the phases are carrying current both during the running of the motor and when attempting to start the motor, as for example on a single phase and also to protect the motor windings from excessive current conditions and to provide this protection by operating the same voltage sensitive circuit the same way by switching on a transistor by producing a negative resistance in the transistor upon creation of a forward current.

It is also desirable to provide protection for components other than the motor and that the protection system provide this additional feature.

It is an object of this invention to provide a three-phase motor protection device which is adapted to operating at different frequencies and voltages and over a wide range of motor currents for triggering the protective action.

It is another object of this invention to provide for control of the motor power which varies the time function of the control inversely to the degree of current increase.

SUMMARY OF THE INVENTION

Control for an electric motor uses a current-to-voltage converter to provide a full wave rectified DC voltage to an input circuit. The input circuit has an adjustment means for adjusting the voltage.

The unijunction transistor under a pre-determinable voltage develops a forward current and a negative resistance resulting in conduction through the unijunction transistor and as a result the operation of an output switch means which in turn controls the motor current.

A detector circuit senses a deficiency in the motor current in the form of a missing voltage to switch on a transistor and through a Zener diode change the voltages on the unijunction transistor to cause the same actuation of the unijunction transistor described above with the resultant operation of the output switch means.

There is also provided in connection with the switching transistor means for actuating the unijunction transistor under motor start-up conditions in the event of absence of current in one phase and without a voltage at the input. This is achieved by the switching transistor in its conducting condition producing current flow in a transistor which charges a timing capacitor to produce a voltage on the anode of the unijunction transistor and consequently creating the conduction as noted above which results in the operation of the output switch means.

A timing circuit for providing a voltage to a unijunction transistor provides an inverse time function in conjunction with the voltage provided by the input circuit. This timing circuit includes means for adjusting the elapsed time in which the timing circuit provides a voltage to the unijunction transistor.

The output switch means consists of a device which is actuated by the energy released from a storage capacitor when the unijunction transistor conducts.

BRIEF DESCRIPTION OF THE DRAWINGS

The above-noted invention will be more clearly understood when considered in view of the following description taken together with the accompanying drawings in which:

FIG. 1 is a block diagram of the stages making up the component parts of the circuitry according to this invention.

FIGS. 4, 5 and 6 are diagrammatic views of output switch circuits operable in the circuit of this invention.

DETAILED DESCRIPTION OF THE INVENTION

Figure 2A:
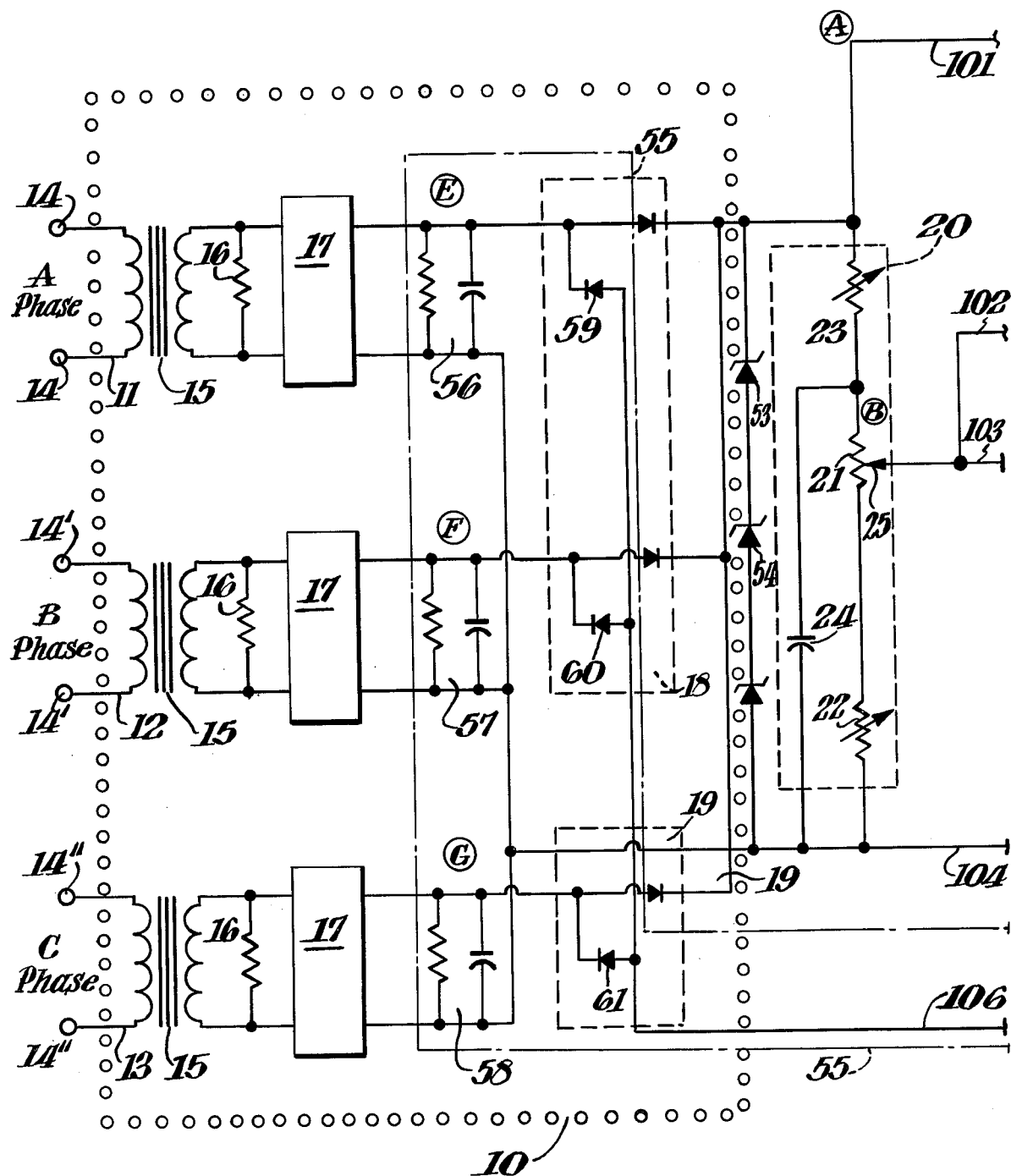
FIGS. 2a and 2b combine to provide a diagrammatic view of an electronic circuit for sensing abnormal conditions in the operation of a three-phase motor.

The diagrammatic circuit arrangement shown in FIG. 1 illustrates the circuit connections for controlling an electric motor not shown.

The block diagram of FIG. 1 illustrates the system of this invention having a current-to-voltage converter 10 which receives the AC supply and converts the three phases to a rectified DC voltage. The rectified DC voltage from converter 10 is fed to an input sealing circuit 20 which provides adjustability in the current level to which the voltage output of the circuit 20 is proportional.

The voltage output of scaling circuit 20 is applied to both a quick trip starting circuit 40 and an inverse time and unijunction trigger circuit 29.

The trigger circuit 29 senses the voltage output of sealing circuit 20 which is a voltage sensitive to and varying in proportion to the motor current. The trigger circuit 29 is under the potential of both a reference voltage and this current sensitive voltage, the current sensitive voltage being normally lower in potential than the set reference voltage. When the current sensitive-voltage is increased by a motor current overload to a potential greater than the reference voltage, a current is triggered in circuit 29 to produce a pulse delivered to an output switch 26 which is thereupon actuated to interrupt the motor power supply.

An output switch 26 operated through the control of the trigger circuit 29 is suitably connected to the motor power supply so as to interrupt the supply and stop the motor.

The timing circuit 40 by means of an RC network times the application of the voltage output of the scaling circuit to the trigger circuit 29. The timing circuit 40 includes fast time trip circuitry. This fast trip time circuit is adjustable so that in the event the motor current producing a voltage at B increases beyond 160% of the pre-set current level the capacitor 42 can be charged to the trip voltage within a variable period of from 5 to 20 seconds. This adjustment is effected by the potentiometer 51 of the fast trip time circuit. Accordingly the time circuit 40 monitors the activation of the output switch 26 with adaptability to motor current ranges so that the cutoff under a single phasing condition under running conditions will be quicker than under single phase start-up condition.

A single phase detector circuit 55 is sensitive to a failure of current in any of the motor phases and is caused to operate by a change in a voltage resulting from a failure of the motor current. Upon such actuation the circuit 55 reduces the reference voltage in trigger circuit 29 which in turn triggers a current in circuit 29 producing a pulse delivered to the output switch which is thereupon actuated to interrupt the motor power supply.

Figure 2B:
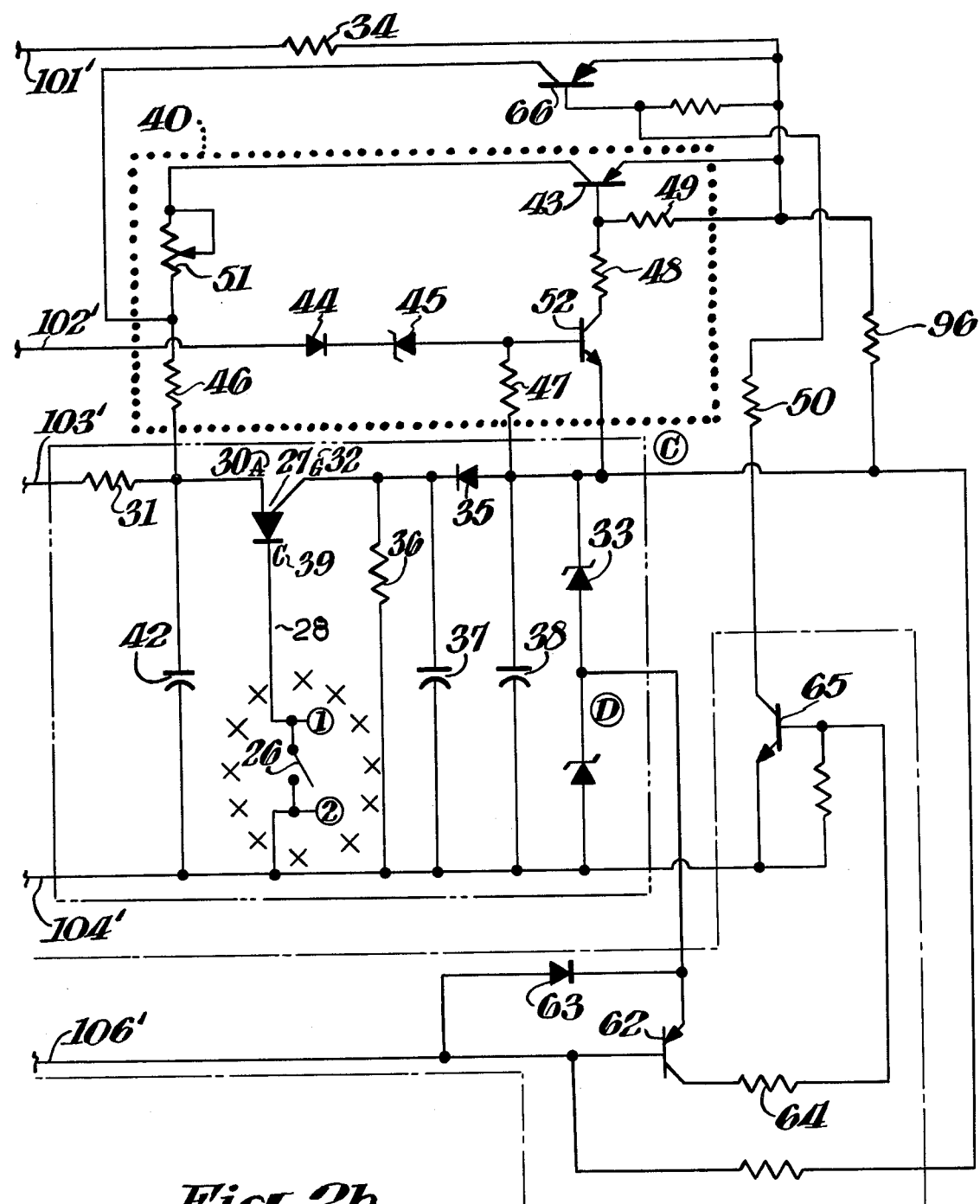

An embodiment of this invention is shown in FIGS. 2a and 2b. FIGS. 2a and 2b combined show the circuit including the stages current-to-voltage converter 10, input scaling circuit 20, quick trip starting circuit 40, inverse time and unijunction trigger circuit 29, output switch 26 and single phase detector 55.

The two parts of the system illustrated by FIGS. 2a and 2b are interconnected by line conductors 101, 102, 103, 104, 105 and 106 shown in FIG. 2a and line conductors 101', 102', 103', 104', 105' and 106' shown in FIG. 2b.

The current-to-voltage converter stage 10 is made up of three identical current-to-voltage converters 11, 12 and 13. Each of the converters 11, 12 and 13 are connected to a phase winding of the motor through appropriate terminals. Converter 11 is connected to the A phase windings through terminals 14. Converter 12 is connected to the B phase windings through terminals 14'. Converter 13 is connected to the C phase windings through terminals 14''. The three identical converters 11, 12 and 13 each consist of a current transformer 15, a loading resistor 16 and a full wave bridge rectifier 17, for example of suitable voltage and current rating, to produce from each single phase full wave rectified DC voltage with a ripple. The current transformer 15 is suitable to provide a flat frequency response in the output of the converters 11, 12 and 13. Flat frequency response refers to the uniformity of the voltage to which the current is converted in relation to a wide spectrum of a.c. frequencies in the current. For example, it is a feature that a fairly uniform voltage response is obtained at frequencies ranging from 20 to 200 Hertz. This provides flexibility in the current-to-voltage conversion.

The three rectified DC ripple voltages from the respective converters 11, 12 and 13 having a suitable voltage-to-frequency relationship, are combined by the bridge rectifiers 18 and 19 to provide a three-phase rectified DC voltage with reduced ripple at point A.

An input circuit 20 connected to point A consists of potentiometer 21, resistor terminals 22 and 23 and a capacitor 24. The potentiometer 21 provides an adjustability of the current together with the resistor trimpots 22 and 23 which can be set to provide a range of current levels within which the potentiometer 21 operates. The adjustable contact 25 of the potentiometer 21 is at the voltage proportional to the output of the current-to-voltage converter 10. An output switch 26 controls the supply of motor current to the motor so that actuation of the switch 26 turns off the supply. Representative switch circuits for the output switch 26 are illustrated in FIGS. 4, 5 and 6.

The output switch 26 is operated through a control circuit incorporating a programmable unijunction transistor 27 which is connected to the output switch 26 through line conductor 28. The operation of the UJT 27 is effected in the voltage sensing circuit 29. The voltage sensing circuit includes the sliding contact 25 which provides a voltage level indicated at point B. The UJT 27 having its anode 30 connected to point B through resistor 31 and its gate 32 connected to a point C of a reference voltage appearing across a Zener diode 33 in conjunction with a current limiting resistor 34. In the voltage sensing circuit 29 the diode 35 and the resistor 36 form a temperature compensating network to offset voltage drift in the anode-to-gate junction in the UJT 27. A capacitor 37 is provided as a noise filter on the gate 32 and a capacitor 38 is an energy storage device for storing the energy.

The voltage of the input circuit at point B is set at a potential below that of the reference voltage at point C during normal operating conditions. The anode 30 being connected to the input circuit 20 at point B is connected to a voltage which is proportional to the motor current. The resistor 34 is connected to the point A as a power source and the resistor 34 and the Zener diode 33 being selected to provide the 11 volt reference voltage at C. The resistor 96 insures a charge on a timing capacitor 42 of 11 volts or more. The Zener diode 33 is maintained at about a predetermined voltage at which the conduction through the Zener in a forward direction maintains the voltage on the Zener cathode at the 11 volt reference voltage adjusting the resistance so as to maintain the voltage constant with current. As long as the small leakage current remains constant the reference voltage at C is maintained.

When the voltage at B is either less than or only equal to the voltage at C, there is no appreciable current through the junction at the cathode 39 of the UJT 27. However, when the voltage at B is greater than at C, then the forward current from anode 30 to cathode 39, a negative resistance is produced and the UJT 27 conducts between the anode 30 and the cathode 39. When the UJT 27 thus conducts, the charge on capacitors 38 and 42 will discharge through UJT 27 and through the output switch circuit 26. The pulse through the output switch circuit 26 triggers the switch to actuate the switch and interrupt the flow of current to the motor. Thus the voltage at B is the trip voltage. Suitable embodiments of the output switch 26 are described below.

The timing of the application to the anode 30 of the voltage at point B is determined by the timing circuit 40 comprised of a resistor 31 and a capacitor 42. This RC network provides an inverse time function in conjunction with the voltage at point B directly proportional to the sensed motor current. The following equation expresses this inverse time function where $t$ = Time to trip in seconds
$T$ = Time constant of RC network (Resistor 31 × Capacitor 42)
$V$ = Voltage at Point "B" on schematic
$t = T \, \mathrm{Log}_e (1 - 11/V)$ With an 11 volt reference voltage the voltage at point B ranges in value from 11 to 16.5 volts with the potentiometer 21 being positionable with respect to the motor current increases from 100% to 150% for overload rating.

Figure 3:
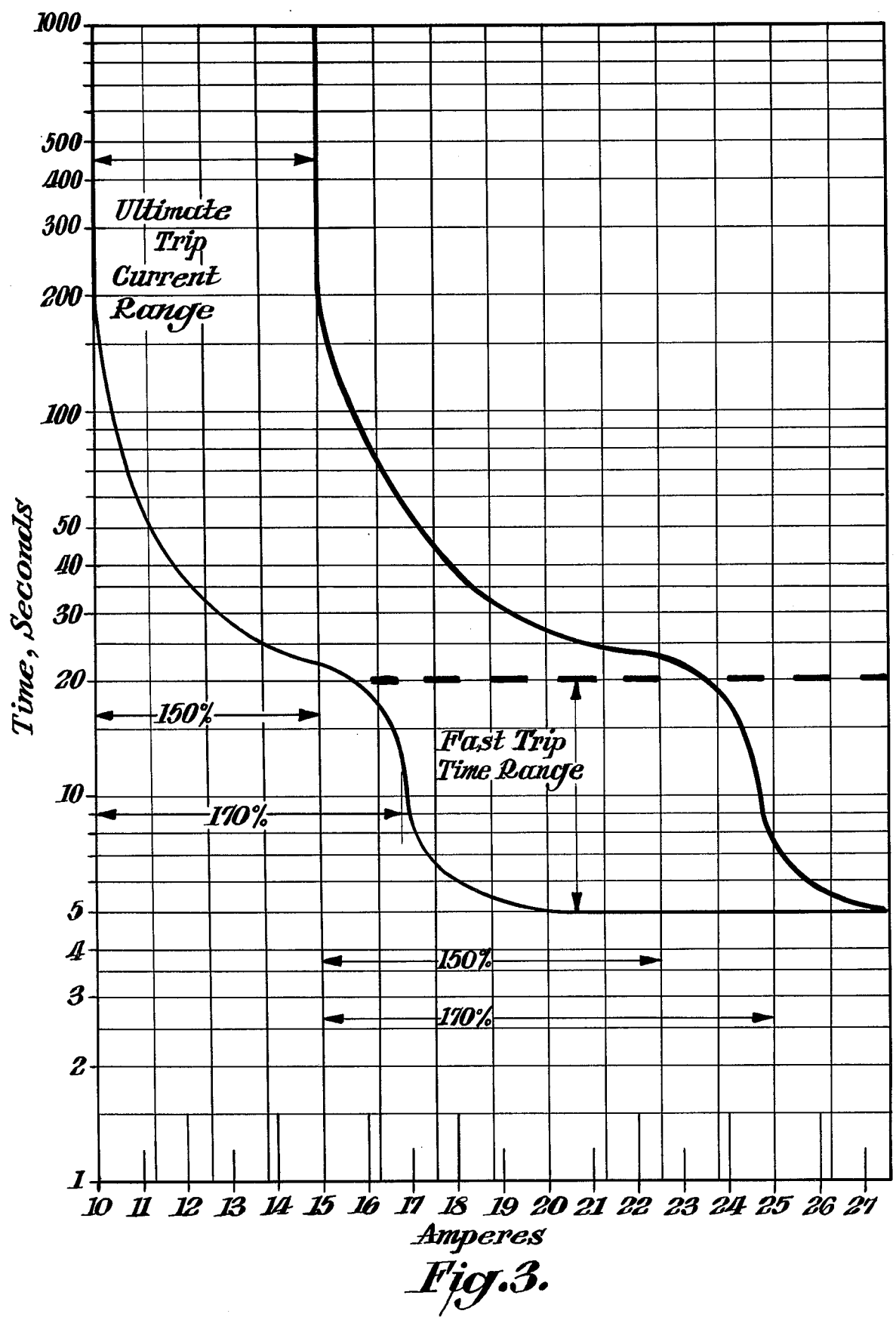
FIG. 3 is a graph illustrating trip time characteristics of the timing circuit of the electronic circuit of this invention.

The timing circuit includes fast time trip circuitry which may be coordinated to the motor being protected. The quick trip time adjustment circuit described herein is adjustable from 5 to 20 seconds. It is comprised of transistors 52 and 43, diodes 44 and 45, resistors 46, 47, 48, 49 and potentiometer 51. Adjustability is provided by the potentiometer 51. Reference is made to FIG. 3 graphically showing the trip time characteristics. Referring again to FIGS. 2a and 2b, as the voltage at point B increases beyond the 160% current level, diode 45 begins to conduct biasing transistor 52 into the "on condition" which in turn biases transistor 43 "on". The current flow emitter-to-collector through transistor 43, resistor 46 and potentiometer 51 charges capacitor 42 in parallel with the normal charging circuit for capacitor 42 from point B through 31. The graph of FIG. 3 shows time on the ordinate and current amperes on the abscissa. It shows that the fast trip time lies between 5 and 20 seconds, which time period adjustment is effected by the potentiometer 51.

For example with a base current of 10 amperes at 160% overload at 20 seconds the fast time trip circuit operates.

Also associated with the timing circuit 40 are diodes 53 and 54. These diodes prevent damage to the components due to over-voltage or overcurrent during a period of "motor in-rush" which might occur during start-up with an inoperable phase. The diodes 53 and 54 also serve to hold the voltage at A during a period of "motor in-rush", so that the actuation of the unijunction transistor 27 is no faster than under an overload condition, say of 180% of overload rating.

The single phase detector circuit 55 is made up of three RC networks, 56, 57 and 58. Each of these RC networks 56, 57 and 58 is attached respectively to the bridge 17 of one of the voltage converters 11, 12 and 13. The RC networks 56, 57 and 58 being connected respectively to the current-to-voltage converters 11, 12 and 13 respectively. Thus in normal operation a voltage appears at point E in the network 56, point F in network 57 and point G in network 58. This voltage is applied through the diodes 59, 60 and 61 attached respectively to points E, F and G. The diodes 59, 60 and 61 are in the bridges 18 and 19. The voltage is applied to the base of a comparator amplifier 62. The diode 63 is used as a clamp to prevent the reverse voltage across the base-to-emitter of transistor 62 from exceeding the rated 5 volts of transistor 62. The emitter of the PNP comparator amplifier 62 is attached to point D. The base of the comparator 62 being held more positive than the emitter by the bridge voltage. Thus during normal operating conditions the voltage from the RC networks 56, 57 and 58 holds the comparator amplifier 62 non-conducting. When the bridge voltage from points E, F and G drops on the base of amplifier 62, the base becoming less positive, current flows from the emitter through the amplifier 62 and through the emitter-collector junction of amplifier 62 and through a resistor 64 with the result that the voltage and current at D is reduced causing the voltage at point C to be reduced by a similar degree. The reduced leakage current at Zener diode 33 is determined by the voltage drop across resistor 64. The reduced leakage current in turn determines the lowered reference voltage at C which permits the voltage at B to be higher and creating a condition in the trigger circuit 29 similar to that described above. Accordingly, the UJT 27 is actuated as described above which in turn leads to an actuation of the output switch 26 to cutoff the current to the motor.

The above description of the triggering of comparator amplifier 62 with a resultant actuation of UJT 27 represents a description of the operation of the phase failure embodiment of this invention which takes place when the motor is operating.

It is a feature of the present invention that the protection is provided against phase failure at start-up. Clearly it is important to abort the starting of the motor if the starter is actuated with current through less than all of the three phases. Attempting to start on a single phase, for example, produces a current flow which is approximately 8 times the normal current under full load conditions with current flowing in the phases. It will be appreciated that with start-up under the abnormal condition the transistor 62 is switched to a conducting condition and the reference voltage C is lowered as described above. Also as a result of the conducting condition of transistor 62 a circuit comprised of a transistor 65 and a transistor 66 is brought into operation. Transistors 65 and 66 are switched to a conducting condition and emitter-collector current flow through transistor 66 charges capacitor 42 of the timing circuit 40 through resistor 46 to produce a voltage on the anode 30 of the unijunction transistor 27. The transistor 66 receiving a signal current from transistor 65 increases the voltage between the emitter and the base and as a result of the current flow there is an increase in voltage in a line conductor from the collector of transistor 66. Accordingly a voltage is built up exceeding the voltage produced at point C by the conduction through transistor 62. This results in actuation of the output switch 26.

In a specific application of the preferred embodiment of this invention as shown in FIGS. 2a and 2b the identified components have the following values:

| | |
|---|---|
| restitor 16 | 39 K ohms ½ W |
| potentiometer 21 | 100 K ohms |
| resistors 22, 23 | 50 K ohms |
| UJT 27 | 2N6028 |
| resistor 31 | 180 K ohms |
| diode 33 | N5232B |
| resister 34 | 10 K ohms |
| diode 35 | 1N4454 |
| resister 36 | 100 K ohms |
| capacitor 37 | .1 μf, 25 volts |
| capacitor 38 | 100 μf, 15 volts |
| capacitor 42 | 100 μf, 25 volts |
| transistor 43 | 2N4122 |
| diode 44 | 1N4454 |
| diode 45 | 1N5232B |
| resistor 46 | 33 K |
| resistor 47 | 22 K |
| resistor 48 | 1 K |
| resistor 49 | 22 K |
| resistor 50 | 330 K |
| potentiometer 51 | 1 meg ohm |
| transistor 52 | 2N4124 |
| diode 53 | zener 27V |
| diode 54 | zener 27V |
| RC networks 56, 57 & 58 | resistor 100 K and capacitor .2 μf 75 V |
| transistor 62 | 2N4122 |
| diode 63 | 1N4454 |
| resistor 64 | 1K |
| transistor 65 | 2N4124 |
| transistor 66 | 2N4122 |

The embodiment of switch 26 illustrated in FIG. 4 contains a reed relay switch circuit consisting of line conductors 70 and 71 attached to terminals 1 and 2 respectively in the line conductor 28, and a relay 72 and a suppressor diode 73. When the current flows from anode 30 to cathode 39 as a result of the gate becoming less positive the charged capacitors discharge their voltage through the relay coil 72 and accordingly the relay 72 is energized. Normally open contacts 74 and 75 are actuated to a closed position to thus provide the switch closure. The method of operation of the reed relay switch circuit is normally open and closed on triggering of the UJT 27.

The diode 73 suppresses a spike in the discharge applied to the reed relay 72.

The embodiment of switch 26 illustrated in FIG. 5 is a DC output switch consisting of transistor 76, silicon controlled rectifier 77, zener 78 acting as a clamp and voltage/time suppressor of capacitor 79 and resistance 80. To start the motor with the D.C. switch, first the SCR 77 is actuated by application of a voltage from an assembly 81. This suitable voltage producing assembly 81, as shown, is made up of start and stop buttons 82 and 83, a coil 84 connected in series and contacts 87 in parallel with the start button 82. The coil 84 and the contacts 87 comprise a relay for controlling the motor power circuit. Closing the start button 82, applies a voltage for example of 48 volts to the gate 86 of the SCR 77 via a coupling capacitor 85. The voltage on the gate 86 makes the SCR 77 conducting and energizing the coil 84 in assembly 81 closes contacts 87. This latches "on" the SCR 77.

The anode-to-cathode voltage of SCR 77 in the latched condition is approximately 1 volt. If an overload occurs in the motor and UJT 27 triggers on, a voltage is applied across a resistor 97 and transistor 76 will be switched on deep in saturation, bypassing current around SCR 77 causing it to commutate off. This deenergizes the coil 84 and by opening contacts 87 disconnects the motor power.

As transistor 76 base drive decays as timing capacitor 42 and filter capacitor 38 discharge, the voltage at Point "H" increases beyond the DC supply voltage due to the inductive energy stored in coil 84. Zener diode 78 begins to conduct when the output voltage exceeds its blocking threshold and clamps the voltage at "H" to a level under the voltage breakdown rating of transistor 76. Suppressor components capacitor 79 and resistor 80 form an RC network which functions to limit the dv/dt rate of rise of voltage across SCR 77 to a value insufficient to make SCR 77 conducting by rate effect.

The short time period for the turn-off operation in the event of overload is of the order of 50 milliseconds.

The embodiment of switch 26 illustrated in FIG. 6 is an A.C. output switch having a reed assembly relay 88 to which is connected a circuit consisting of a triac 89, a dv/dt circuit of capacitor 90 and resistor 91, and filter of resistor 92 and capacitor 93.

For the operation of the reed assembly 88, reference is made to the description of the embodiment in FIG. 4 above.

The reed assembly 88 consists of line conductors 70' and 71' attachable to terminals 1 and 2 respectively in the line conductor 28. Relay 72' and suppressor diode 73' provide the energizable loop. Contacts 74' and 75' are normally in closed position. When current flows from anode 30 to cathode 39 the resultant energization of reed relay 72' opens to contacts 74' and 75' for a short period as for example, 50 milliseconds. This causes a power interruption as follows. The triac 89 is triggered on in a I+ and III− mode when the contacts 74' and 75' are closed and provide current across the current limiting resistor 94. The triac 89 in turn controls an external switch assembly 95 by relay operation. When the triggering of the unijunction transistor 27 causes the opening of the contacts 74' and 75' the triac 89 turns off for the period of time when the contacts 74' and 75' are open. When triac 89 is non-conducting its control of assembly 95 causes the contacts of assembly 95 to open by dropping out of the relay and this in turn opens the three lead control circuit of assembly 95 and cuts the power to the motor.

A preferred embodiment of the invention has been shown and described herein, but it will be apparent that modifications in structure and assembly may be made without departure from the spirit of the invention. In view of the possible modifications it is not intended that the invention be limited by the showing herein except as defined by the appended claims.

What is claimed is:

1. A circuit for protecting motor windings of a 3-phase motor with a unijunction transistor energized by a DC voltage to activate an interruption of the operation of the motor, wherein the motor has a continuous motor rating which comprises current-to-voltage converter comprised of current transformers, resistors, and full-wave bridge rectifiers providing a rectified full-wave DC voltage proportional to the current flowing in the motor windings and a time delay circuit consisting of a Resistor-Capacitor network and a unijunction transistor detector which functions in conjunction with the current sensitive voltage to provide an inverse time response characteristic to the voltage applied to the anode of the unijunction transistor which triggers into a conducting state whenever the anode voltage exceeds the reference voltage in the gate terminal of the unijunction transistor, wherein the improvement consists of incorporation of a fast timing inrush timer with said time delay circuit, said inrush timer being activated by the current sensitive DC voltage whenever the motor current exceeds the continuous motor rating by a predetermined percentage to charge said timing capacitor in accordance with said current sensitive voltage, and including means for adjusting the elapsed time period within which said DC voltage sensitive to said excessive motor current provides the charge to said capacitor.

2. A circuit as claimed in claim 1 wherein the resistor-capacitor network has a time constant which provides a time period of increase of the current sensitive voltage to energize said trigger voltage which is inverse in length of time to the volt potential of said current-sensitive DC voltage.

3. A circuit for protecting motor windings of a 3-phase motor against phase failure during motor running condition with a unijunction transistor energizable by a DC voltage to actuate an interruption of the operation of the motor, which comprises, current-to-voltage converters comprised of current transformers, resistors, and full-wave bridge rectifiers providing a rectified full-wave DC voltage proportional to the current flowing in the motor windings and means for applying said current-sensitive DC voltage across the anode and cathode of a unijunction transistor, means for applying a reference voltage across the gate and cathode of the unijunction transistor, the reference normally being of greater potential than said current-sensitive DC voltage, means applying the reference voltage across a zener diode having a voltage pre-determined by conduction in a forward direction to maintain said reference voltage, means for detecting the failure of one or more of the motor phases, said detecting means switching a comparator transistor into conduction, means connected to said comparator transistor and to zener diode, said means being rendered conductive upon conduction through the comparator transistor to reduce the current at the zener diode and to reduce the reference voltage, whereby a forward current through the unijunction transistor is produced when upon reduction of the reference voltage the DC voltage exceeds the reference voltage, a switch connecting the motor windings to the power supply being operable by forward current through the unijunction transistor to disconnect the motor windings from the power supply.

4. Circuitry as claimed in claim 3 wherein means actuated by said switched-on comparator transistor provides D.C. voltage at said input whereby a voltage is applied to draw current through said unijunction transistor in the absence of D.C. input voltage under motor starting conditions.

5. A circuit for protecting motor windings of a 3-phase motor against phase failure during motor start condition with a unijunction transistor energizable by a DC voltage to actuate an interruption of the operation of the motor, which comprises, current-to-voltage converters comprised of current transformers, resistors, and full-wave bridge rectifiers providing a rectified full-wave DC voltage proportional to the current flowing in the motor windings and means for applying said current-sensitive DC voltage across the anode and cathode of a unijunction transistor, means for applying a reference voltage across the gate and cathode of the unijunction transistor, the reference normally being of greater potential than said current-sensitive DC voltage, means for detecting the failure of one or more of the motor phases at motor start-up, said detecting means switching a comparator transistor into conduction, means connected to said comparator transistor and said means for applying said current-sensitive voltage to said unijunction transistor, said means being rendered conductive upon conduction through the comparator transistor to provide a voltage exceeding the reference voltage, whereby a forward current through the unijunction transistor is produced when the said voltage exceeds the reference voltage, a switch connecting the motor windings to the power supply being operable by forward current through the unijunction transistor to disconnect the motor windings from the power supply.

6. A circuit as claimed in claim 1 wherein a switch connected to the unijunction transistor is activatable by the energization of the unijunction transistor to interrupt the AC supply to the motor windings, said switch comprising a relay coil connected in series with the anode and cathode of the unijunction transistor and a set of contacts connected to means in the AC supply for interrupting the AC supply, the relay coil being energized during the current conduction through the anode-cathode of the unijunction transistor, the energizing of the relay closing said contacts whereby the interrupting means interrupts the AC supply and the operation of the motor.

* * * * *